Feb. 15, 1949.     R. L. CAWOOD ET AL     2,461,720
MIXING APPARATUS
Filed July 29, 1944    2 Sheets-Sheet 1

Richard L. Cawood
Bryant W. Richardson
INVENTORS
BY Hawgood and Van Horn
ATTORNEYS

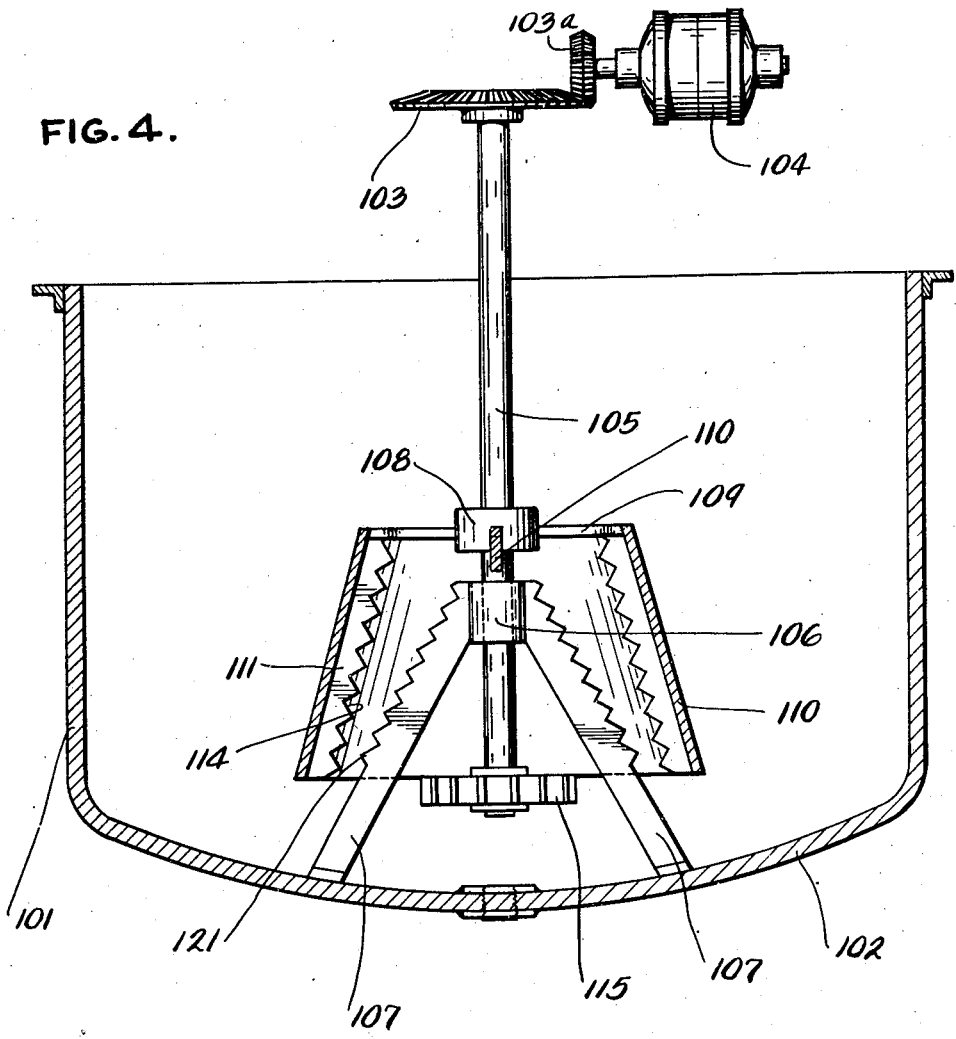

UNITED STATES PATENT OFFICE 2,461,720

MIXING APPARATUS

Richard L. Cawood and Bryant W. Richardson, East Liverpool, Ohio, assignors to The Patterson Foundry & Machine Co., East Liverpool, Ohio, a corporation of Ohio Application July 29, 1944, Serial No. 547,234

8 Claims. (Cl. 259—96)

This invention relates to mixing fluids and is particularly applicable to mixtures of pluralities of liquids, liquids and gases, and liquids and solids.

An object of the invention is to provide an improved mixing device which will mix together materials, at least one of which is fluid or liquid, rapidly and efficiently.

Another object is to provide an improved mixing device which will require little power in its operation.

Another object is to provide an improved mixing device which will be composed of few and simple parts.

Another object is to provide an improved mixing device which may be readily and economically manufactured.

Another object is to provide an improved mixing device which may easily be assembled and disassembled.

Another object is to provide an improved mixing device which will cause interacting mixing currents.

Another object is to provide an improved mixing device which will comminute suspended solid materials.

Another object is to provide an improved mixing device which will disintegrate suspended solid materials.

Another object is to provide an improved mixing device which will dissolve suspended solid materials.

Another object is to provide an improved mixing device which will emulsify or beat together two fluids to a fine state of division.

Another object is to provide an improved mixing device which will be self-cleaning.

Another object is to provide an improved mixing device which will require a minimum of servicing.

Other objects will hereinafter appear.

The invention will be better understood from the description of apparatus constituting one practical embodiment thereof, illustrated in the accompanying drawing, the illustrations of the drawings being as follows:

Figure 4 is a view similar to Figure 1 showing another embodiment of the invention which is particularly suitable for use with materials which are unusually difficult to dissolve or disintegrate.

Figure 1:
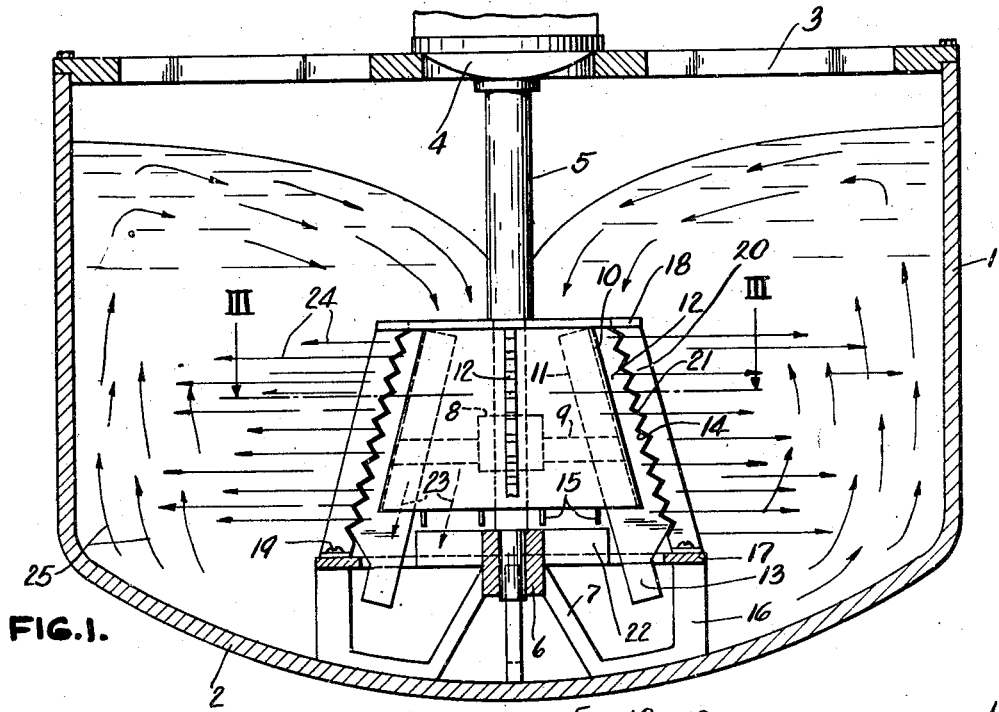
Figure 1 is a side elevational view of a mixing device embodying my invention, parts of the tank structure and the like which enclose and support the device being broken away.
Figure 2:
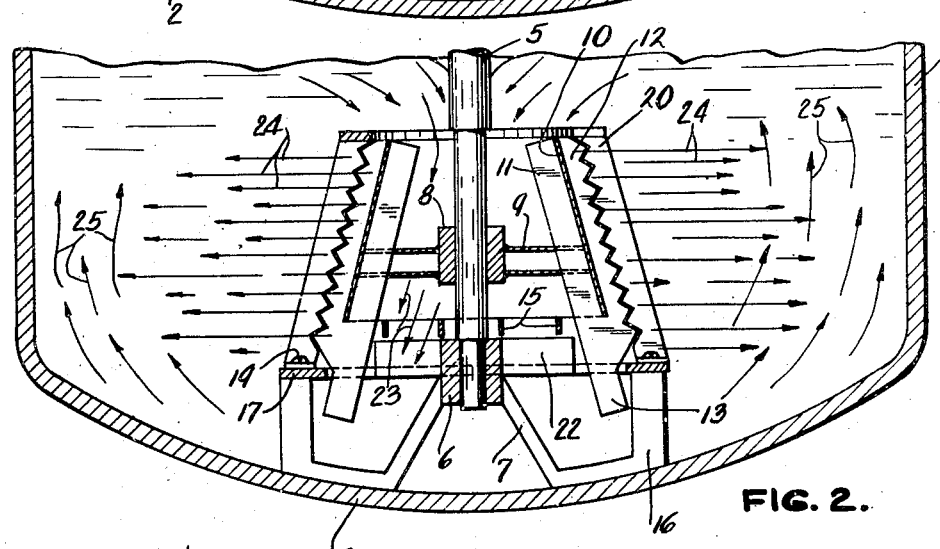
Figure 2 is a central vertical sectional view through the apparatus of Figure 1.
Figure 3:
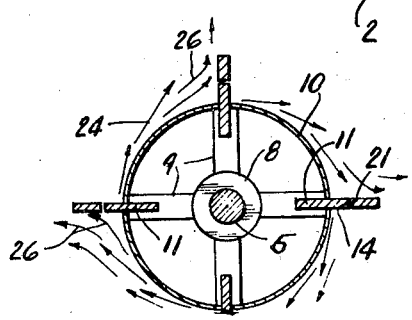
Figure 3 is a plan sectional view taken on the line III—III of Figure 1.

The apparatus shown consists of a tank having cylindrical sides 1 and a curved bottom 2, the top of the tank being spanned by a supporting spider 3 which carries centrally of the tank a driving means, shown generally as an electric motor 4. This motor is preferably of a type including enclosed speed reduction gearing, although it will be apparent that a bevel gear might be substituted therefor, this in turn driven by a bevel pinion on a horizontal shaft, or the drive might be by belt and pulleys, or any other equivalent well-known or desired speed reducing driving means may be used to rotate the mixing device shaft 5.

The shaft 5 extends downwardly along the axis of the tank, being supported at its lower end in a bearing 6 carried by a spider-like bracket 7.

Fixed to the exterior of the shaft, adjacent its lower end, is a central hub 8, of a rotor to which hub are fixed, as by welding, tubular arms 9 carrying at their outer ends a frustro-conical impeller 10 shown as arranged with its smaller end uppermost.

The rotor or impeller is shown as frustro-conical in shape in the drawings, but it will be apparent that it need not be of precisely a mathematical surface of revolution. In fact, a frustro-pyramidal rotor functions in substantially the same manner, the corners between the various sides acting to impel liquid much in the manner of the blades which will be hereinafter described.

Inasmuch as there are many frustro-pyramidal and similar geometrical shapes and combinations of shapes which may be used to obtain the benefits of the invention, and for the sake of simplicity and brevity of description, it will be understood that the words "frustro-conical" when used hereinafter shall be defined as including any shape having its parts generally symmetrically arranged around the axis of the shaft 5 and having a smaller opening at its top and a larger opening at its bottom.

The impeller 10 has fixed to it a series of fins, vanes or blades, these blades shown as each consisting of an inner blade portion 11, an outer blade portion 12, and a depending end 13. The blades may be welded to the impeller, and extending in general in the direction of elements of the conical surface. The outer blade portion is, throughout the majority of its extent, serrated as indicated at 14.

The upper ends of the blades illustrated terminate adjacent the top of the impeller and their lower ends project or depend a substantial distance below the bottom of the impeller. Extending across the bottom of the impeller are a series of parallel chordally arranged fins or bars 15.

Supported on the upturned ends 16 of the bracket 7 is a cage which consists of a lower ring 17, an upper ring 18, the former being secured to the bracket as by machine screws 19.

The rings are spaced apart by upwardly extending inclined vanes or blades 20, which have inner serrated surfaces 21 substantially conjugate to the surfaces 14, but spaced therefrom slightly, as illustrated in the drawing.

Fixed to the bracket 7 are a plurality of stationary chordally extending bars or vanes 22 arranged to underlie and be spaced slightly below the bars 15 of the rotor.

The parts of the rotor are all conveniently united as by welding, and the parts of the cage similarly are conveniently and effectively united in this fashion.

While the arrangement of the vanes has been very specifically described as these are shown in the first three figures of the drawing, it will be apparent that considerable variation in these parts and the other associated parts may be made while preserving the spirit of the invention and obtaining the functions of the blades illustrated. For example, the depending ends 13 of the blades may be replaced by further extending the vanes 15. The vanes 12 themselves might not be continuous, but may consist of series of sections. The shape of these sections may be varied as by making them with straight, curved, or scalloped edges giving them the form of knobs, bosses, buckets, or the like, it only being essential that they be capable of impelling the liquid as is described in conjunction with the action of the vanes illustrated. They may extend along elements of the frustro-conical surface, or may be arranged somewhat helically thereon or in any other manner desired.

The operation of the device is as follows:

With the tank filled with liquid to a height somewhat above the top of the rotor and cage, the motor is put into operation, causing the rotor to rotate rapidly within the cage.

The internal portion of the blades 11 cause liquid within the rotor to be carried around with it, and centrifugal force produced by this rapid rotation carries the liquid from the smaller end to and through the larger end of the conical impeller 10.

Liquid on the exterior of the rotor, however, is not restrained by the conical surface, and so is thrown off tangentially in various horizontal planes, as indicated by the arrows 24.

Below the bottom of the conical impeller 10, the extensions 13 of the blades also tend to move the liquid tangentially, but its direction at this point is also influenced by the downward flow of the liquid as indicated by the arrows 23.

It will be apparent that, as the liquid is moved downwardly to impinge upon the tank bottom 2, it will be deflected outwardly and upwardly as indicated by the arrows 25.

Consequently, in the annular spaces between the sides of the rotor and the side wall 1 of the tank, there are created two sets of currents which tend to move in generally mutually perpendicular directions, one set of currents moving outwardly in horizontal planes as indicated by the arrows 24, and the other set moving upwardly along generally vertical cylindrical surfaces as indicated by the arrows 25.

Where these currents intersect each other, an interaction somewhat akin to a shearing action is produced, and this may be referred to as the action of "shear planes."

A somewhat similar shearing action occurs between liquid which is being thrown outwardly tangentially by the outer rotor blades 12 where this encounters liquid which has been stopped in its outward motion adjacent the stationary vanes 20, as indicated at 26.

It is found that this "shear plane" type of action increases greatly the speed with which thorough mixing, dissolving or disintegrating of the materials may be obtained.

Also, the rapid passage of the serrated edges of the rotor blades 14 adjacent the stationary edges 21 of the stationary blades produces a definite shearing action, capable of quickly and effectively disintegrating as cominuting any solid material which may be in suspension in the liquid, such as vegetable or mineral fibers, granulated material, or other organic or inorganic solids and the like, and so disperses any such solid material in finely divided condition through the mass of liquid.

It is not necessary that the two sets of serrated edges actually come in contact, but they may be spaced apart further than would shear blades in cutting solid materials in the air, as the particles on which they operate are partially held from displacement by the inertia of the fluid in which they are suspended, and it is found that some shearing action takes place even with the outer cage entirely removed, which causes such solid material to be much more rapidly incorporated in the fluid than has been possible with prior types of mixers, although not as rapidly as when the rotor and cage are used together.

In Figure 4 is shown a modified embodiment of the invention which is particularly useful with some types of materials which are very difficult to incorporate in liquid mixtures, even with the apparatus of the preceding figures.

In this embodiment is shown a tank generally similar to that above described, consisting of a cylindrical wall 101 and curved bottom 102.

The mixer shaft 105 is driven, through a bevelled gear 103 fixed to this shaft, by a bevelled pinion 103a, fixed to the shaft of the driving motor 104.

The lower part of the shaft 105 is supported in a guide bearing 106 carried by downwardly diverging arms 107, secured to the bottom 102 of the tank.

These arms are themselves serrated on their outer edges, as indicated at 121, so that they constitute both the bearing supporting bracket and the stationary cage of the mixing device.

Fixed upon the shaft 105 is a frustro-conical rotor 110, carried by arms 109 extending radially from a hub 108 secured on the shaft.

Within the rotor are elementally extending ribs or vanes 111 having inner serrated edges 114. It will be noted that the serrated edges 114 and 121 approach most closely at the bottom of the rotor or impeller and diverge from each other in an upward direction.

Secured to the end of shaft 5, just below the level of the bottom of the impeller is a turbine 115 which serves to throw liquid outwardly at this point.

The action of this apparatus is very similar to that of the one previously described, as it will be apparent that the liquid within the rotor is caused to move down rapidly and to rotate rapidly with the rotor by the fins or vanes 111.

This downwardly moving and whirling liquid, carrying with it whatever solids may be present, moves rapidly transversely past the stationary edges of the supporting arms 107, introducing a shear action of the type previously described. Any tendency of these arms to restrain the liquid in its rotative motion is offset by the action of the turbine 115 in throwing it outwardly as soon as it emerges from the bottom of the impeller.

Here again, as in the first embodiment, the shape and placing of the vanes or fins may be considerably varied and these may be made continuous or interrupted, of thin plates or in the form of bosses, etc., so long as they provide a grip tending to move the liquid with the impeller as it rotates.

It will be understood that the term "mixing" is used hereinafter to include mixing, comminuting, distintegrating, dispersing, blending, dissolving, emulsifying, plasticizing, homogenizing, macerating, churning, and all such operations as may be performed by mechanically agitating mixtures of liquids, or liquids and solids, whether or not gases are also included, and which operations result in solutions, suspensions, dispersions, changes in viscosity and the like.

The speed of rotation of the impeller is somewhat critical, although this cannot well be reduced to a single figure or formula, because there are so many variations in the characteristics of the fluids which may be mixed, as of viscosity, specific gravity, etc., that a different critical speed exists for each variation of any of these factors.

However, it will be apparent that if the impeller be rotated relatively slowly, it will function as a pump, creating some pressure differential on the fluid within it through centrifugal force, and thus causing a downward flow of this fluid. On its exterior, however, the tendency of vanes 12 is to carry an enveloping layer of fluid around with the impeller, this layer being held in place by the upward flow of the surrounding fluid which is being displaced by that moving down within the impeller.

In this situation the impeller functions only as a simple type of centrifugal pump. The rotating layer of fluid only serves to reduce friction between it and the rotor.

However, when the impeller is rotated at a speed above that which is critical for the particular material being handled, centrifugal force throws this fluid outwardly, as indicated in the drawings, causing the streams thus produced to intercept, with a shearing action, the rising current produced by the fluid driven through the interior of the rotor.

A type of turbulence is thus produced which is totally different from the circulation of the pumped stream alone, and a much more rapid, complete, and effective mixing results.

While we have described the illustrated embodiment of our invention in some particularity, obviously many others will readily occur to those skilled in this art, and we do not, therefore, limit ourselves to the precise details shown and described herein, but claim as our invention all embodiments, variations and modifications coming within the scope of the appended claims.

We claim:

1. Mixing apparatus comprising a shaft, driving means therefor, a frustro-conical impeller carried by the shaft and substantially coaxial therewith, and vanes extending elementally on the exterior of the frustro-conical impeller and projecting beyond the large end of the frustro-conical impeller, and a plurality of stationary vanes spaced outwardly from and extending in susbtantially the same direction as the vanes of the exterior of the impeller.

2. Mixing apparatus comprising a shaft, driving means therefor, a frustro-conical impeller carried by the shaft and substantially coaxial therewith, and vanes extending elementally on the exterior of the frustro-conical impeller and projecting beyond the large end of the frustro-conical impeller, and a plurality of stationary vanes spaced outwardly from and extending in substantially the same direction as the vanes of the exterior of the impeller, the vanes on the impeller and the stationary vanes having serrated interfitting edges.

3. Mixing apparatus comprising a frustro-conical impeller, a series of parallel chordally extending vanes depending from the lower end of the impeller, and a series of stationary vanes beneath said chordally extending vanes.

4. Mixing device comprising a container, a vertically arranged shaft therein, driving means operatively connected to the upper end of the shaft, a stationary bracket in the bottom of the container having a bearing supporting the lower end of the shaft, a frustro-conical impeller coaxial with and fixed to the shaft adjacent its lower end, and a plurality of elementally extending vanes fixed to the interior surface of the frustro-conical impeller and extending beyond the larger end thereof.

5. Mixing device comprising a container, a vertically arranged shaft therein, driving means operatively connected to the upper end of the shaft, a stationary bracket in the bottom of the container having a bearing supporting the lower end of the shaft, a frustro-conical impeller coaxial with and fixed to the shaft adjacent its lower end, and a plurality of elementally extending vanes fixed to the interior surface of the frustro-conical impeller and extending beyond the larger end thereof, and stationary vanes carried by the bracket and spaced from the bottom of the container.

6. Mixing device comprising a container, a vertically arranged shaft therein, driving means operatively connected to the upper end of the shaft, a stationary bracket in the bottom of the container having a bearing supporting the lower end of the shaft, a frustro-conical impeller coaxial with and fixed to the shaft adjacent its lower end, a plurality of elementally extending vanes fixed to the exterior of the impeller and extending beyond the larger end thereof, and a plurality of stationary vanes surrounding said vanes carried by the bracket.

7. Mixing device comprising a container, a vertically arranged shaft therein, driving means operatively connected to the upper end of the shaft, a stationary bracket in the bottom of the container having a bearing supporting the lower end of the shaft, a frustro-conical impeller coaxial with and fixed to the shaft adjacent its lower end, a plurality of elementally extending vanes fixed to the exterior of the impeller and extending beyond the larger end thereof, and a plurality of stationary vanes surrounding said vanes carried by the bracket, said vanes having serrated edges, the serrations of the vanes on the impeller passing within the serrations of the stationary vanes as the impeller is rotated.

8. Mixing device comprising a container, a vertically arranged shaft therein, driving means operatively connected to the upper end of the shaft, a stationary bracket in the bottom of the container having a bearing supporting the lower end of the shaft, a frustro-conical impeller coaxial with and fixed to the shaft adjacent its lower end, a plurality of elementally extending vanes fixed to the exterior of the impeller and extending beyond the larger end thereof, and a plurality of stationary vanes surrounding said vanes carried by the bracket, said vanes having serrated edges, the serrations of the vanes on the impeller passing within the serrations of the stationary vanes as the impeller is rotated, a plurality of chordally extending vanes secured to the bottom of the impeller, and a plurality of chordally extending vanes fixed to the bracket and underlying the chordally extending vanes of the impeller.

RICHARD L. CAWOOD.
BRYANT W. RICHARDSON.

REFERENCES CITED

The following references are of record in the file of this patent:

UNITED STATES PATENTS

| Number | Name | Date |
|---|---|---|
| 391,787 | Friend | Oct. 30, 1888 |
| 444,345 | Gabbett | Jan. 6, 1891 |
| 612,317 | Dundon | Oct. 11, 1898 |
| 801,709 | Brown | Oct. 10, 1905 |
| 1,456,034 | Newman | May 22, 1923 |
| 1,540,853 | Macfie | June 9, 1925 |
| 1,768,955 | Johnson | July 1, 1930 |
| 1,794,214 | Thurm et al. | Feb. 24, 1931 |
| 1,804,966 | Valentine | May 12, 1931 |
| 1,962,803 | Bruins | June 12, 1934 |
| 2,278,051 | Ambrose | Mar. 31, 1942 |
| 2,309,594 | Hutchings | Jan. 26, 1943 |

FOREIGN PATENTS

| Number | Country | Date |
|---|---|---|
| 4,260 | Great Britain | Feb. 28, 1894 |
| 225,767 | Great Britain | Dec. 11, 1924 |
| 284,913 | Great Britain | Feb. 9, 1928 |